United States Patent
Huff et al.

(10) Patent No.: US 8,527,419 B1
(45) Date of Patent: Sep. 3, 2013

(54) END TO END (E2E) PROCESSING

(75) Inventors: Lowell R. Huff, Manchester, MO (US); Geoffrey R. Williams, Midlothian, TX (US)

(73) Assignee: Bank of America Corporation, Charlotte, NC (US)

( * ) Notice: Subject to any disclaimer, the term of this patent is extended or adjusted under 35 U.S.C. 154(b) by 805 days.

(21) Appl. No.: 12/163,392

(22) Filed: Jun. 27, 2008

(51) Int. Cl.
*G06Q 40/00* (2012.01)

(52) U.S. Cl.
USPC .......................... 705/45; 382/137; 707/104.1

(58) Field of Classification Search
USPC .......................... 705/45; 382/137; 707/104.1
See application file for complete search history.

(56) References Cited

U.S. PATENT DOCUMENTS

2007/0235518 A1  10/2007  Mueller et al.
2007/0288382 A1*  12/2007  Narayanan et al. ............. 705/45
2008/0006687 A1  1/2008  Mueller et al.

OTHER PUBLICATIONS

"Specifications for Electronic Exchange of Check Image Data" (current standard is ANS X9.100-180-2006), Accredited Standards Committee XP Incorporated, Jan. 1, 2003, Withdrawn.
"The Check Clearing for the 21st Century Act", Public Law 108-100, 108th Congress, Oct. 28, 2003, 117 STAT. 1177.
Specifications for Electronic Exchange of Check and Image Data, The Accredited Standards Committee X9, Inc. (ASC X9, Inc), Mar. 31, 2003, Withdrawn/Retired.

* cited by examiner

*Primary Examiner* — Daniel Felten
(74) *Attorney, Agent, or Firm* — Michael A. Springs; Moore & Van Allen, PLLC; Padowithz Alce

(57) ABSTRACT

A method and apparatus for monitoring through completion the automated processes performed by a bank in validating Image Cash Letters for purposes of check clearing under the provisions of the Check21 Act.

16 Claims, 4 Drawing Sheets

END TO END (E2E) PROCESSING

BACKGROUND OF THE INVENTION

This invention relates to the field of Image Cash Letters (ICLs), and more particularly to a method and apparatus for performing automated tracking and reporting on the processing and posting of received ICLs to their named payee accounts.

The Check Clearing for the 21st Century Act, Public Law 108-100 108th Congress ("Check 21 Act") was enacted into law on Oct. 28, 2003, and took effect a year later on Oct. 28, 2004. This is an initiative by Congress to revise the rules governing the exchange of checks between banks by enabling an electronic check collection system for the country. As known, checks are negotiable instruments in the form of draft drawn on a checking account, and are payable on demand. Check collection, or "check clearing", facilitates payment by moving checks from the banks where they are deposited (Receiving Banks) to the bank on whose accounts they are drawn (Paying Bank), and then moving the payment in the opposite direction. This credits accounts at the Receiving Bank and debits accounts at the Paying Bank. The Federal Reserve participates in check clearing through its nationwide facilities, but many checks are cleared by private sector arrangement.

The Check21 Act allows banks (defined by the Check 21 Act as any financial institution identified under section 19(b)(1)(A) of the Federal Reserve Act) to create a new negotiable instrument called a "substitute check". The substitute check is a digitized image of the original check, which may be electronically transmitted and processed. It includes front and back images of the original check, together with the check-writer's bank routing number, account number, and the dollar amount of the check in a magnetic ink character recognition (MICR) line along the bottom. Under the Check 21 Act these digitized images are electronically exchanged between banks using an Accredited Standards Committee (ASC) X9.37 protocol and file format[1] adopted by the Federal Reserve Banks.

[1] "Specification for Electronic Exchange of Check and Image Data"

The substitute checks are included in the X9.37 file as a Type 25 "Check Detail Record" (or for convenience here as the acronym "CDR"). The front and back images of the original check are captured as Type 52 records, which include the TIFF (tagged image file format) images, and are included in the X9.37 file along with their corresponding type Type 25 CDR. Within the X9.37 file the CDRs are organized in batches, one or more CDRs per batch, and the batches are organized into one or more Image Cash Letters ("ICL"s) within the X9.37 file. The Image Cash Letter is considered the electronic equivalent of the inter-bank paper document transmittal letter that accompanies cash items sent between banks. For purposes of this application the terms X9.37 file and ICL file are considered equivalent, and will here be used here interchangeably. In addition to the individual CDR MICR information they contain, each X9.37 file or ICL file also presents the ICL cash totals as well as the sum amounts drawn on the different CDR endpoint accounts, which facilitates reconciling, if necessary.

While the Check 21 Act doesn't require banks to change the way they collect and process paper checks, it makes CDRs an option so that it indirectly requires banks and their customers to accept CDRs when requested by another bank or other financial institution choosing that option. This means that a paying bank (the bank on which the check is drawn) must accept and pay the demand based on the electronic transmission of check payment information. If the paying bank requires paper documentation, the collecting bank (any bank handling a check for collection, except the paying bank) can still perform and benefit from electronic delivery but must also then provide paper copies of the CDRs, which are known as Image Replacement Documents, or "IRDs" Similarly, bank customers who earlier received copies of their cancelled checks now receives IRDs of the CDRs that their bank has received.

Since the purpose of the Check 21 Act is to improve the speed and efficiency of the check clearing process, it does not require a contract[2] between banks (e.g. paying bank, collecting bank, depository bank, and returning banks) and bank customers, or 3rd persons and non-customer entities that present substitute checks for payment or deposit. The Act instead requires banks that transfer, present, or return substitute checks and receive consideration for performing this service, must warrant their accuracy.[3]

[2] Check 21 Act; Section 4 GENERAL PROVISIONS GOVERNING SUBSTITUTE CHECKS; (a) NO AGREEMENT REQUIRED
[3] SEC. 5. SUBSTITUTE CHECK WARRANTIES A bank that transfers, presents, or returns a substitute check and receives consideration for the check warrants, as a matter of law, to the transferee, any subsequent collecting or returning bank, the depository bank, the drawee, the drawer, the payee, the depositor, and any endorser (regardless of whether the warrantee receives the substitute check or another paper or electronic form of the substitute check or original check) that: (1) the substitute check meets all the requirements for legal equivalence under section 4(b); and (2) no depository bank, drawee, drawer, or endorser will receive presentment or return of the substitute check, the original check, or a copy or other paper or electronic version of the substitute check or original check such that the bank, drawee, drawer, or endorser will be asked to make a payment based on a check that the bank, drawee, drawer, or endorser has already paid.

The received ICLs include CDRs which are to be forwarded as well as CDRs that are being returned for processing either by the receiving bank or forwarded to another paying bank. Initial processing then requires: (1) verifying the X9.37 format and contents; (2) identifying all 3rd party receiving banks for CDRs in the file; (3) aggregating those 3rd party CDRs by the identified receiving bank(s) into one or more outgoing ICLs; and (4) forwarding each outgoing ICL to its identified receiving bank.

The banks each receive and transmit the X9.37 files though a secure interface, which includes input channels for receiving incoming X9.37 files forwarded by others and output channels for transmitting the X9.37 files that it creates. For each received or created X9.37 electronic transmittal a tracking record is created which follows the processing of each included ICL through its multiple electronic check processing points; each of which performs specific business requirement processing. These processing steps vary based on the CDR and the requirements of the processing organization. Logical events are defined that are based on the outputs from each check processing point within the processing path. The tracking record is updated through a matching process that is based on the output data elements that are available from each processing step. These processing points include the input and output channels, the ICL processing system, an image exchange processing system, a check processing system, a reformatter system, and a warehousing system.

This is a continuous process that runs on a 24 hour basis. Cycle times are computed for each processing system as the ICL file progresses from receipt to posting. Various reports are created on both a detail and summary basis, including completed as well as exceptions. Alerts are created to indicate ICL files that have taken longer than expected in any given validation processing step. With the volume of ICL files processed and with the ICL tracking record accompanying the cash letter transmittal it is possible to have instances in which the tracking record alone, or both the tracking record and the ICL itself become lost and unaccounted for until some later time in which a follow-up demand is made. There is a need, therefore, to have a monitoring system which is easily implemented, that does not modify or alter the existing verification procedures of the overall validation process, and which is capable of providing real time notice of process status.

BRIEF SUMMARY OF THE INVENTION

The present invention is to a method and apparatus which monitors the automated validation process performed on electronic Image Cash Letter (ICL) transmittals and files received by a bank under the provisions of the Check21 Act, such validation process requiring the successful completion of one or more ICL verification procedures performed by an automated check clearing processing system of a type that issues an ICL identification signal for each received ICL transmittal, and issues a completed event signal for each verification procedure completed, each ICL identification signal and its related ICL completed event signals being compiled by the processing system into a validation tracking signal that reports the validation record of each ICL.

According to the present invention an End to End (E2E) Processing method and apparatus is responsive to the ICL identification signals and the completed event signals from the automated processing system to create ICL event histories for each processed ICL transmittal that provide oversight to the ICL validation records provided by the automated processing system as well as providing the bank with timely failure notice of ICL transmittals with missing completed event signals. In further accord with the present invention, the event histories created by the E2E Processing method and apparatus provide performance measures for each verification procedure as well as the overall validation process based on the time tags associated with each completed event signal, thereby identifying problem performance on the basis of a given verification procedure or a given ICL transmittal.

In still further accord with the present invention the monitoring performed by the E2E Processing method and apparatus does not require modification of, or access to, the automated processing system software, but instead uses only the external ICL identification signal and ICL completed event signals provided by the automated processing system to provide the monitoring function and the capability of independently auditing the overall validation process accuracy and performance.

In yet still further accord with the present invention the E2E Processing method and apparatus reformats the processing system ICL identification signal and the ICL completed event signal to eliminate E2E Processing dependency on the automated processing system format and protocol, the reformatting being accomplished by normalizing the processing system signal formats for each signal.

The End to End Processing of the present invention is capable of tracking the ICL files through each of the steps that they must be processed through for validation and posting to their end point accounts. These processing steps can vary based on the origin of an ICL (3$^{rd}$ party transmittal or bank customer), its required routing, and the requirements of the processing organization. As a result the present E2E Processing method and apparatus ensures that every ICL received is successfully processed and properly accounted.

These and other aspects, features, and advantages of the present invention, will become apparent in light of the following detailed description of exemplary embodiments thereof, as illustrated in the accompanying Drawing.

DETAILED DESCRIPTION OF THE INVENTION

The present invention will now be described in terms of specific, example embodiments. It should be understood, however, that the invention is not limited to the example embodiments disclosed, and that not every feature of the methods and systems described is necessary, to implement the invention as claimed in any particular one of the appended claims. Various elements and features of various embodiments are described in order to fully enable the invention.

Throughout this disclosure, where a process or method is shown or described, the steps or sub-processes of the method or methods may be performed in any order or simultaneously, unless the contrary is clear from the context, or is expressly stated. Also, time lapses can occur between steps, and can vary in length. It should also be understood that with respect to flowcharts, block diagrams, and signal flows, not every possible flow, path, or structure is shown. Rather, for clarity, only those flows and structures important to the inventive concepts being discussed may be illustrated, even though others flows and structures may be discussed within this disclosure.

The reader may be aided by an initial understanding of some of the terminology used in this disclosure. The meaning of the terms and phrases used here are as would be understood by those persons skilled in the relevant arts, or will be made clear as terms are used. The use of the terms such as "electronic checking", "check clearing", and "substitute check", as well as related terms, is meant to have essentially the same meanings that would be understood by those of ordinary skill in the art of banking and financial instruments. It is also important to recognize that the term "bank" as used here is intended to include any type of financial institution covered by the Check21 Act.

Figure 1:
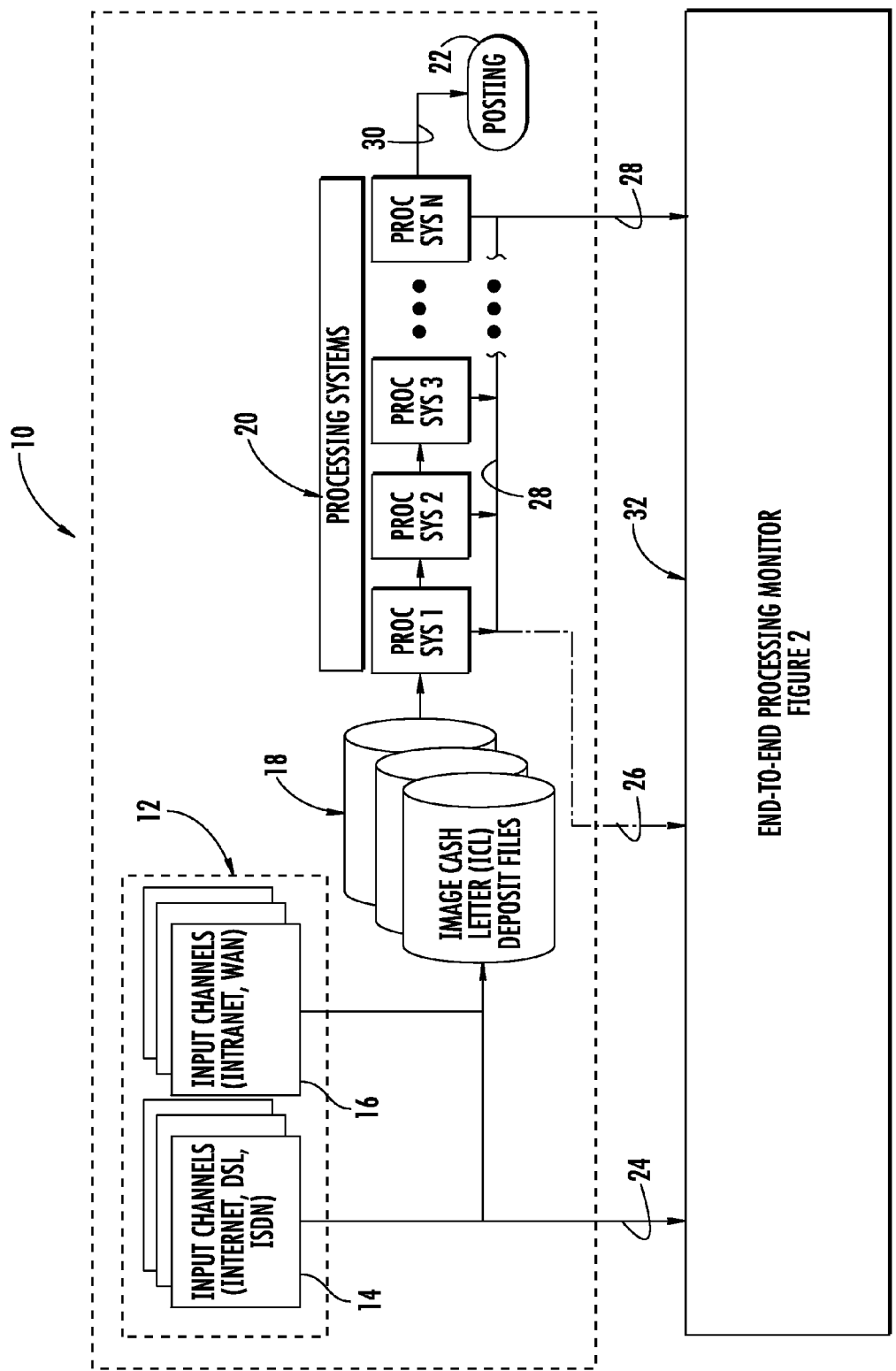
FIG. 1, is a system block diagram illustrating the application of the End to End Processing of the present invention to an electronic check processing operation.

The End to End Processing ("E2E") of the present invention monitors the various processing steps performed by a bank in validating a received image cash letter (ICL). An X9.37 ICL file is considered "sent" to a receiving bank only when the entire ICL file has been delivered to the bank's validation process. FIG. 1 is a simplified block diagram of a typical secure portal interface and validation processing center 10 of a bank. The processing center 10 includes a secure input interface 12 having a plurality of receiving channels 14, 16. External ICL transmittals from other banks (including the Federal Reserve) and vendors such as SVPCO (Check and Electronic Clearing Service of the Clearing House Payments Company) are presented to receiving channels 12. The receiving channels 14 are for ICLs generated by internal operations of the bank, such as branch offices, bank repositories, and Remote Deposit Services.

The received X9.37 files are stored in an ICL Deposit File database 18 and forwarded in a selected sequence to processing system 20 for validation. Validation is performed by a series of applied software programs performed by mainframe processing systems 1 through N. When validation and processing are complete the ICL items are posted 22 to their respective endpoint accounts. Each received X9.37 file is identified by an array of file characteristics that include: the receiving channel number, file name, sequence number within the file, total dollar amount, number of ICL items, the Origination RT (Routing-Transit) number, Destination RT, create date, create time, posting system, account number, partner name, and work identifier. This identifying information is presented as an either obtained directly from the incoming image file as presented on line 24 or by the processing system 20 from the transmittals and presented on line 26.

The processing system 20 performs each of the verification procedures required by the validation process. The system 20 confirms completion of each verification procedure with an event signal which it provides on line 28 to identify completed milestones of the overall ICL validation process. These event signals are compiled into a validation tracking signal that accompanies the data file for each ICL transmittal to report the validation record for that ICL. When the validation process is complete the processing system 20 provides the ICL items (CDRs) on line 30 to be forwarded for posting to their end accounts.

An End to End (E2E) Process Monitor 32 for performing the E2E Process receives the ICL transmittal identification signals on lines 24, 26, and the event signals on line 28. As described in detail below with respect to FIG. 2, the present E2E process monitors the completion by processing system 20 of each of the verification procedures of the validation process from the outside, by responding to the ICL identification signals and event signals issued by the processing system 20. The E2E Process uses these external signals to create event files which it matches to the incoming ICL transmittals and to then track these event files through the full verification process. In this way it ensures that every ICL transmittal entering the processing system 20 is accounted for, processed, and successfully posted to a customer account. It does this without the knowledge of, or the modification to, the validation processing algorithms.

Figure 2:
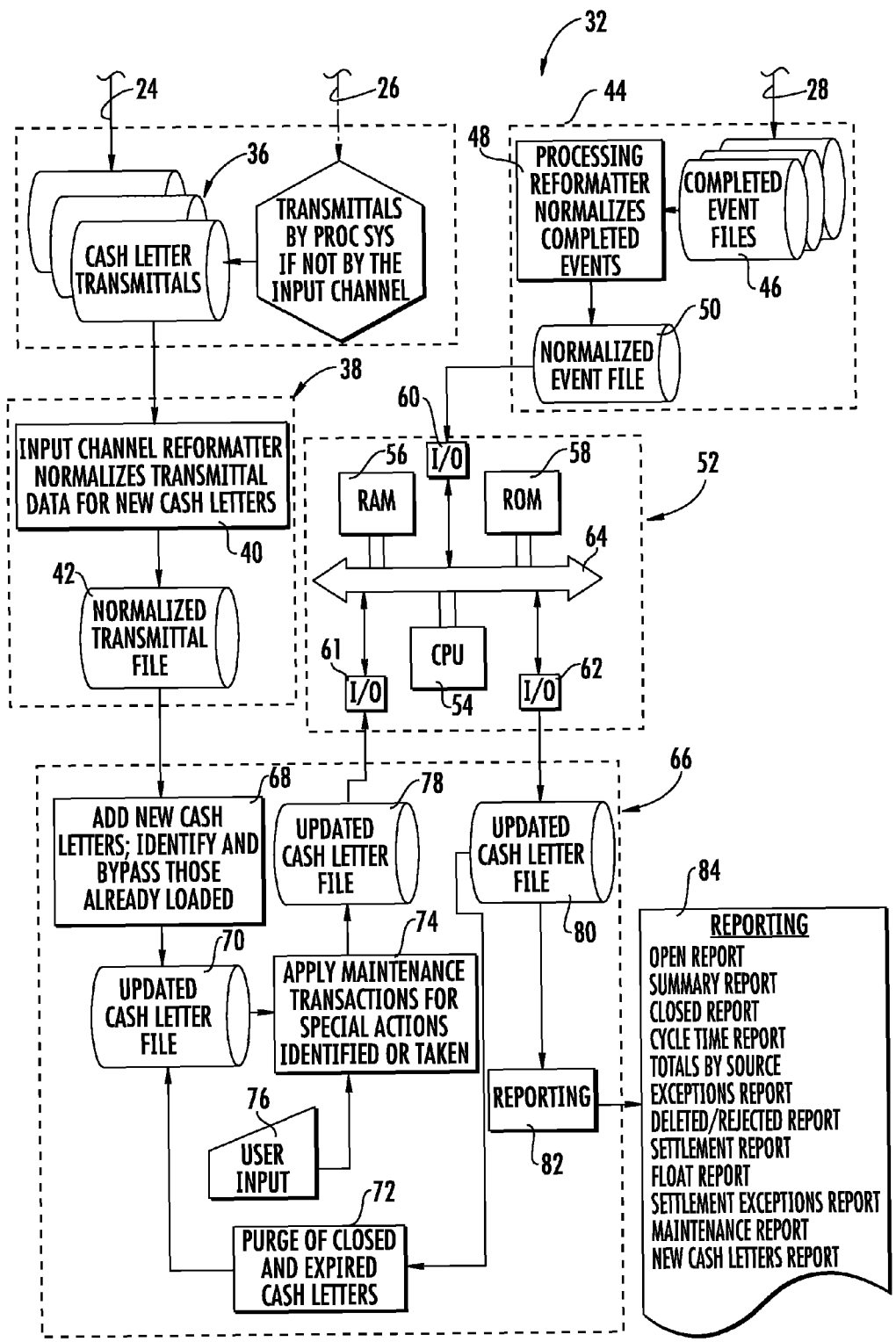
FIG. 2, is a functional block diagram of an exemplary embodiment of the End to End Processing apparatus of the present invention.

Referring now to FIG. 2, the E2E Process Monitor 32 receives the ICL identification signals provided either by the X9.37 file header from the input channels 12 (FIG. 1) on line 24, or from processing system 20 on line 26 from identifying information extracted from the ICL image files. These ICL identification signals are received by an E2E monitor identification signal interface 34 and stored in cash letter transmittals data base 36. The raw identification signals are forwarded to normalizing circuitry 38 where an input channel reformatter 40 normalizes the ICL identification signal based on the input channel it was received on. The normalization procedure allows data from the input various channels (SVPCO, ViewPointe, FED, NetDeposit) to be accepted by the E2E monitor with minimal change to the processing system or validation software. The normalized identification signals are stored in normalized transmittal data base 42.

The event signals on line 28 from the processing system are received by an E2E monitor event file interface 44 where they pass through a completed event files data base 46 and are presented in their issued sequence to completed events reformatter 48 which, in similar fashion to the input channel reformatter 40, normalizes the event completion signals for acceptance by the E2E monitor. The normalized completed events signals include information on the origination RT (routing transit) and the sum dollar amount of the validated ICL. The normalized completed event signals are then stored in a normalized event file data base 50 and forwarded in their received sequence to an E2E monitor signal processor 52. The signal processor is of a known type having a central processing unit (CPU) 54, random access memory (RAM) 56, read only memory (ROM) 58 and input/output (I/O) channels 60-62, which are interconnected through bus 64.

The signal processor 52 receives the normalized completed event signals at I/O 60 and an updated ICL identification signals from a ICL tracking circuitry 66. at I/O 61. The updated ICL tracking signals are the normalized identification signals from data base 42 which have been updated in an ICL event histories file to reflect the current validation process status. The current validation process status is evidenced by the number and type of ICL completed event signals which the event histories file reports. This update is performed by block 68 of the tracking circuitry which adds the normalized identification signals from data base 42 and removes any duplicate identified ICL transmittals and sends this as an updated ICL to data base 70. The data base 70 also receives data on closed and expired ICLs from block 72 and nets these signals against those received from block 68 to provide the corrected normalized ICL identification signals to block 74. Block 74 further updates the corrected normalized ICL identification signals from block 70 to further apply any maintenance transactions that have been identified or taken based upon user input 76, to provide the most current status normalized ICL identification signals to data base 78. The current status ICL identification signals are then presented by data base 78 to I/O 61 of processor 52.

The signal processor 52 compares and matches the current status ICL identification signals with the normalized completed event signals to:
  match and apply completed events;
  calculate cycle times;
  identify "late" events;
  identify suspect current status ICLs or normalized completed events;
  identify exceptions;
  assign partner names;
  identify accounts not found;
  identify duplicates;
  calculate expected settlement dates;
  calculate actual settlement dates.
Based upon the findings made and actions taken by the processor 52 in comparing the current status ICL identification signals and completed event signals, the processor provides identification of closed and expired ICL to data base 80 which provides the updated information to block 72 and to reporting function 82. The types of reports that are generated are user selected, but include those identified in the report menu 84 of FIG. 2.

Figure 3:
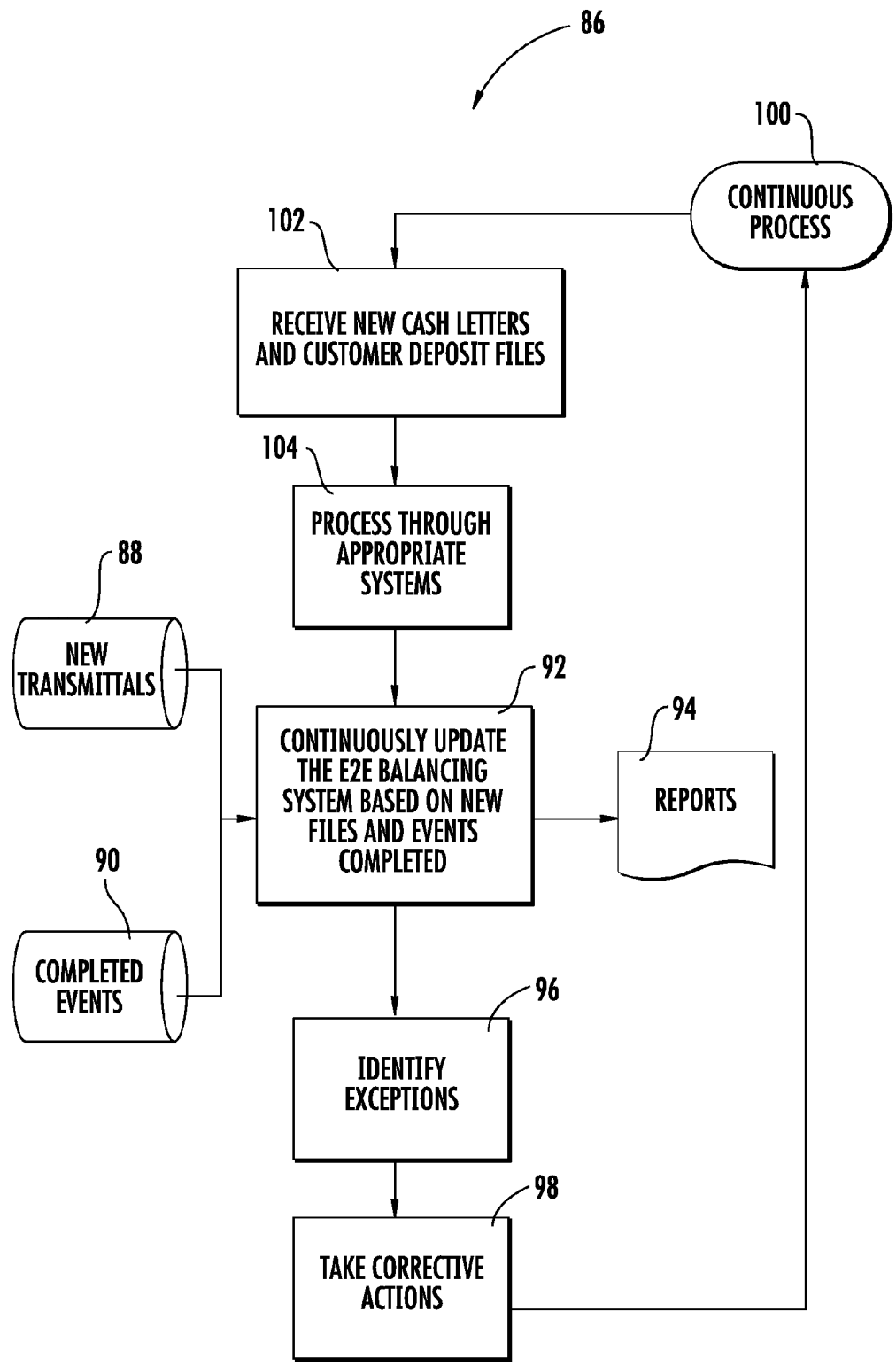
FIG. 3, is a flow chart diagram of the End to End Processing method of the present invention.

The E2E Process is continuous in its monitoring and reporting function. FIG. 3 is a flow chart of the E2E Process 86 in which new ICL transmittal data 88 and completed event data 90 are presented to the E2E signal processing function 92. The processing function 92 provides continuous updates of the instantaneous status of "in process" ICLs and produces different form reports 94 of the monitored events. These include identifying exceptions 96 which must have corrective action taken 98, and the process continues 100 with receipt of new ICL transmittals 102 and their processing through the appropriate systems 104.

Figure 4:
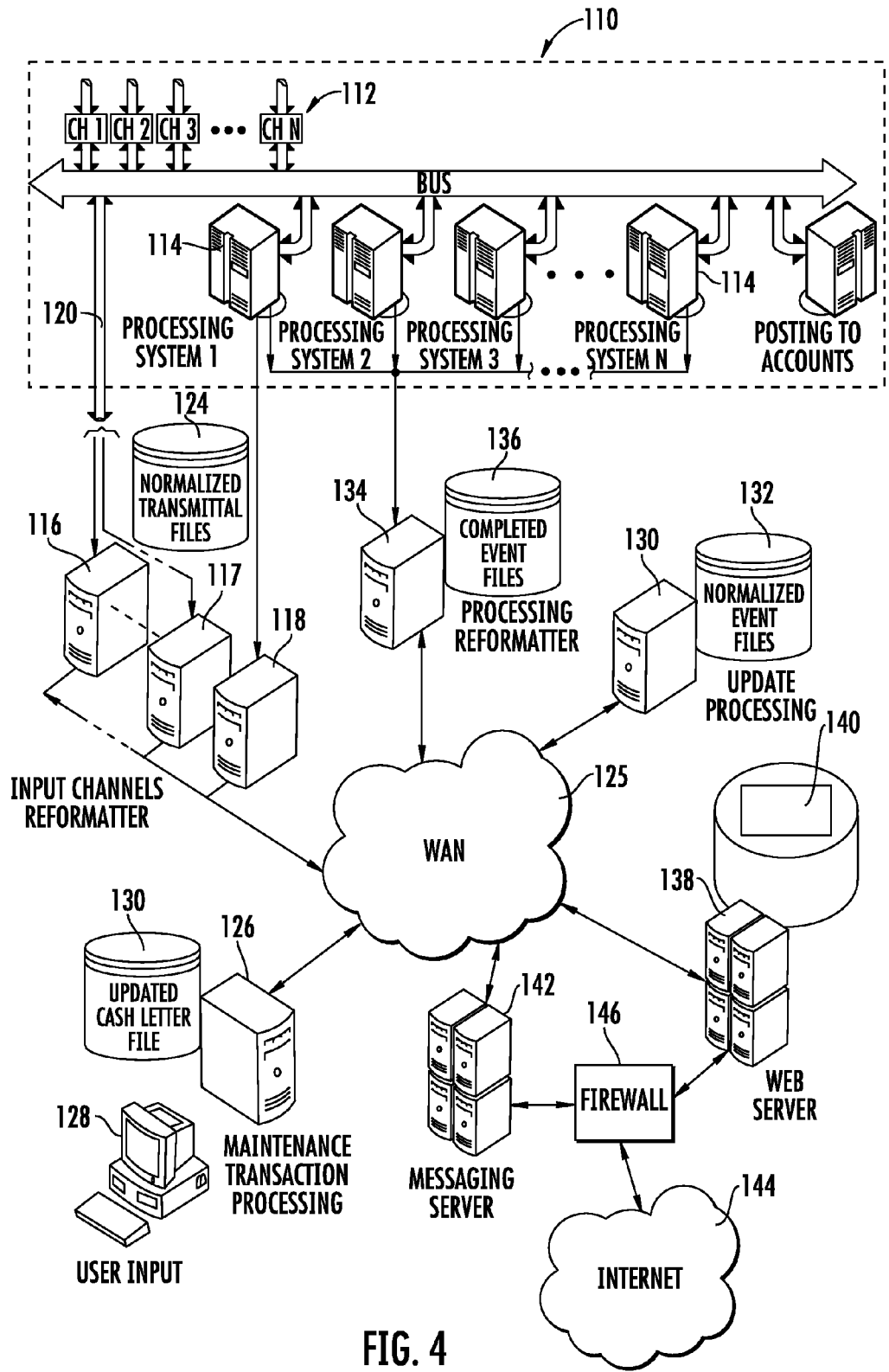
FIG. 4, is system block diagram of an exemplary hardware embodiment for performing the End to End Processing of the present invention.

FIG. 4 is a system diagram of an X9.37 processing center 110 for validating and processing ICL transmittals received on a plurality of input channels 112 in a plurality of mainframe processing systems 114, each hosting one or more software applications that perform individual verification procedures of the overall X9.37 validation process. The E2E process monitor is embodied in one or more E2E software application programs which may be distributed over one or more of the plurality of servers. In the exemplary embodiment of FIG. 4 servers 116-118 function as the input channels reformatter to perform the normalization of the ICL identification signals received on lines 120 from the input channels 112 and/or line 122 to from the processing systems 114. Memory 124 stores the normalized transmittal files which are presented through wide area network (WAN) 125 to server 126.

The server 126 performs the function of the ICL tracking circuitry 66 (FIG. 2) and executes the maintenance transaction processing in response to user inputs provided through personal computer 128 and the purging of closed and expired cash letters (72, FIG. 2) received from server 130 which performs the E2E monitor signal processor (52, FIG. 2) functions by comparing the normalized event signals stored in memory 132. Server 134 performs the function of the processing reformatter (44, FIG. 2) which normalizes the completed event signals stored in the completed event files in memory 136.

The supervision of the E2E process performance may be performed by servers 138 using computer program code instructions. The computer program code instructions can take the form of a computer program product residing on different computer usable or computer readable storage medium, such as in FIG. 4 by a removable "hard disk" storage medium 140. The removable storage medium 60 might also store the computer program code instructions optically, such as in the case of a CD ROM, or on traditional, removable, lower capacity magnetic storage mediums such as diskettes or so-called "zip" disks. IN general, computer programs can reside on any medium that can contain, store, communicate, propagate, or transport the computer software program for use by or in connection with any apparatus, system, or device. A messaging server 142 manages WAN message traffic, and the web server 138 and messaging server 142 are connected to the internet 144 through firewall 146.

Although the invention has been shown and described with respect to exemplary embodiments thereof, it should be understood by those skilled in the art that various changes, omissions, and additions may be made to the form and detail of the disclosed embodiments without departing from the spirit and scope of the invention, as recited in the following claims. Many alternative embodiments and implementations are possible, and the following claims are not intended to limit the scope of the invention to the specific embodiments described.

We claim:

1. A method of monitoring a validation process performed on electronic Image Cash Letter (ICL) transmittals, the method comprising:
   receiving, via a computing device processor, ICL identification data for received ICL transmittals;
   receiving, via a computing device processor, ICL completed event data from an automated processing system, the completed event data signifying completion of each verification procedure performed on each received ICL transmittal;
   reformatting the received ICL identification data for each received ICL transmittal, via a computing device processor;
   reformatting the received ICL completed event data, via a computing device processor; wherein the reformatting of the received ICL identification data and the ICL completed event data normalizes the data to a format that permits joint processing via a common processing device;
   tracking the reformatted ICL identification data for each received ICL transmittal through the time of occurrence of each of its associated completed event data; and
   reporting, as ICL event histories, validation process steps completed for ICL transmittals associated with the reformatted ICL identification data.

2. The method of claim 1 wherein the steps of reformatting include:
   normalizing the received ICL identification data and the ICL completed event data in their as-received format, to provide both in a common format capable of being jointly processed in a common processing device.

3. The method of claim 1 wherein the step of tracking includes:
   recording the received time of the ICL identification data for each ICL transmittal and the event time of the ICL completed event data associated with the ICL identification data;
   calculating, as interval times, the intermediate time between the received time of the ICL identification data and the event times of its associated ICL completed event data, with the sum of such interval times being the cycle time for completing the validation process; and
   identifying, from the calculated cycle times, for reporting in the ICL event histories, selected performance characteristics of the validation process.

4. The method of claim 3, wherein selected performance characteristics identified for reporting in the ICL event histories includes open events which are defined as validation process events which have not occurred within a prescribed time period.

5. The method of claim 3, wherein selected performance characteristics identified for reporting in the ICL event histories includes late events which are defined as validation process events which occur at a cycle time which is greater than a user specified time.

6. The method of claim 3, wherein selected performance characteristics identified for reporting in the ICL event histories includes suspect events which are defined as validation process events which occur do not occur.

7. The method of claim 3, wherein selected performance characteristics identified for reporting in the ICL event histories includes exceptions which are defined as validation process events which are acceptable despite their classification as a late event or a suspect event.

8. The method of claim 3, wherein the step of tracking further includes the step of:
   updating, by user entry, ICL event histories of ICL transmittals on which actions have been taken outside of the validation process.

9. Apparatus for monitoring the completion of a validation process performed on electronic Image Cash Letter (ICL) transmittals the apparatus comprising:
   computing device processor means for receiving ICL identification data for received ICL transmittals and ICL completed event data from automated processing system, the completed event data identifying completion of each verification procedure performed on each received ICL transmittal;
   means for reformatting the received ICL identification data for each ICL transmittal and the ICL completed event signals to a format that allows both data sets to be jointly processed in a common processing device;

means for tracking the reformatted ICL identification data for each ICL transmittal through the time of occurrence of each of its associated completed event data; and means for reporting, as ICL event histories, validation process steps completed for ICL transmittals associated with the reformatted ICL identification data for each ICL transmittal.

10. The apparatus of claim 9 wherein the means for reformatting includes:

means for normalizing the received ICL identification data and the ICL completed event data in their as received format, to provide both in a common format capable of being jointly processed in a common processing device.

11. The apparatus of claim 10, wherein the means for tracking includes:

means for recording the received time of the ICL identification data for each ICL transmittal and the event time of each ICL completed event data associated with the ICL identification data;

means for calculating, as interval times, the intermediate time between the received time of the ICL identification data for each ICL transmittal and the event times of each of the associated ICL completed event data, with the sum of such interval times being the cycle time for completing the validation process; and means for identifying, from the calculated cycle times, for reporting in the ICL event histories, selected performance characteristics of the validation process.

12. The apparatus of claim 11, wherein selected performance characteristics identified for reporting in the ICL event histories includes open events which are defined as validation process events which have not occurred within a prescribed time period.

13. The apparatus of claim 11, wherein selected performance characteristics identified for reporting in the ICL event histories includes late events which are defined as validation process events which occur at a cycle time which is grater than a user specified time.

14. The apparatus of claim 11, wherein selected performance characteristics identified for reporting in the ICL event histories includes suspect events which are defined as validation process events which occur do not occur.

15. The apparatus of claim 11, wherein selected performance characteristics identified for reporting in the ICL event histories includes exceptions which are defined as validation process events which are acceptable despite their classification as a late event or a suspect event.

16. The apparatus of claim 11, wherein the means for tracking further includes: means for updating, by user entry, ICL event histories of ICL transmittals on which actions have been taken outside of the validation process.

* * * * *